United States Patent
Johnson et al.

(10) Patent No.: US 11,157,910 B1
(45) Date of Patent: *Oct. 26, 2021

(54) SELECTIVE PASSIVE VOICE AUTHENTICATION

(71) Applicant: United Services Automobile Association (USAA), San Antonio, TX (US)

(72) Inventors: Zakery Layne Johnson, Santa Clara, UT (US); Gabriel Carlos Fernandez, San Antonio, TX (US)

(73) Assignee: UNITED SERVICES AUTOMOBILE ASSOCIATION (USAA), San Antonio, TX (US)

(*) Notice: Subject to any disclaimer, the term of this patent is extended or adjusted under 35 U.S.C. 154(b) by 61 days.

This patent is subject to a terminal disclaimer.

(21) Appl. No.: 16/723,842

(22) Filed: Dec. 20, 2019

Related U.S. Application Data

(63) Continuation of application No. 15/993,933, filed on May 31, 2018, now Pat. No. 10,515,639, which is a
(Continued)

(51) Int. Cl.
| | |
|---|---|
| *G06Q 20/40* | (2012.01) |
| *G10L 17/22* | (2013.01) |
| *G06K 9/00* | (2006.01) |
| *H04L 29/06* | (2006.01) |
| *H04W 12/06* | (2021.01) |

(Continued)

(52) U.S. Cl.
CPC ... *G06Q 20/40145* (2013.01); *G06K 9/00221* (2013.01); *G06K 9/00892* (2013.01); *G10L 17/06* (2013.01); *G10L 17/22* (2013.01); *H04L 63/0428* (2013.01); *H04L 63/083* (2013.01); *H04L 63/0861* (2013.01);
(Continued)

(58) Field of Classification Search
CPC ... G06Q 20/40145; G10L 17/00; G10L 17/02; G10L 17/22; G10L 17/06; G06F 21/32
USPC ........................................................ 704/273
See application file for complete search history.

(56) References Cited

U.S. PATENT DOCUMENTS

| | | |
|---|---|---|
| 5,229,764 A | 7/1993 | Matchett |
| 7,590,538 B2 | 9/2009 | St. John et al. |

(Continued)

OTHER PUBLICATIONS

U.S. Appl. No. 15/933,933, filed May 31, 2018, Selective Passive Voice Authentication.
(Continued)

*Primary Examiner* — Susan I McFadden
(74) *Attorney, Agent, or Firm* — Perkins Coie LLP

(57) ABSTRACT

Various embodiments of the technology described herein alleviate the need to specifically request enrollment information from a user to enroll the user in a passive voice authentication program. The system can receive one or more spoken words from a user. The system can select at least one word from the one or more spoken words to enroll the user into a voice authentication program without requiring further interaction from the user. The voice authentication program selectively enables access to secure data in response to receiving the at least one word spoken by the user. After enrollment of the user into the voice authentication program, at least one word spoken by the user is received, and the user is authenticated based on the at least one word.

20 Claims, 7 Drawing Sheets

Related U.S. Application Data continuation of application No. 15/226,375, filed on Aug. 2, 2016, now Pat. No. 10,013,983, which is a continuation-in-part of application No. 14/491,740, filed on Sep. 19, 2014, now Pat. No. 9,548,979.

(60) Provisional application No. 62/200,416, filed on Aug. 3, 2015.

(51) Int. Cl.
*G10L 17/06* (2013.01)
*H04W 12/08* (2021.01)
*G10L 15/22* (2006.01)

(52) U.S. Cl.
CPC .......... *H04L 63/102* (2013.01); *H04W 12/06* (2013.01); *H04W 12/08* (2013.01); *G10L 2015/223* (2013.01)

(56) References Cited

U.S. PATENT DOCUMENTS

| | | | |
|---|---|---|---|
| 8,401,539 B2 | 3/2013 | Beenau et al. | |
| 8,965,770 B2 | 2/2015 | Petrushin | |
| 9,007,473 B1 | 4/2015 | Worley, III | |
| 9,082,055 B2 | 7/2015 | Breuer | |
| 9,225,701 B2 | 12/2015 | Gongaware et al. | |
| 9,247,037 B2 | 1/2016 | Clark et al. | |
| 9,262,612 B2 | 2/2016 | Cheyer et al. | |
| 9,538,005 B1 | 1/2017 | Nguyen et al. | |
| 9,548,979 B1 | 1/2017 | Johnson | |
| 9,639,682 B2 | 5/2017 | North | |
| 9,697,836 B1 | 7/2017 | Lousky | |
| 9,710,983 B2 | 7/2017 | Asmar | |
| 9,928,834 B2 | 3/2018 | Liu et al. | |
| 9,928,839 B1 * | 3/2018 | Lester | G06F 21/32 |
| 10,013,983 B1 * | 7/2018 | Johnson | G10L 17/22 |
| 10,013,984 B1 | 7/2018 | Johnson et al. | |
| 10,424,303 B1 * | 9/2019 | Lester | G10L 17/00 |
| 10,515,639 B1 * | 12/2019 | Johnson | H04L 63/102 |
| 10,650,831 B1 * | 5/2020 | Johnson | G10L 17/02 |
| 10,708,257 B2 * | 7/2020 | Dorfman | H04L 63/0823 |
| 2015/0095028 A1 | 4/2015 | Karpey et al. | |
| 2016/0021117 A1 | 1/2016 | Harmon | |

OTHER PUBLICATIONS

U.S. Appl. No. 15/993,501, filed May 30, 2018, Systems and Methods for Authentication Program Enrollment.

U.S. Appl. No. 15/404,468, filed Jan. 12, 2017, Systems and Methods for Authentication Program Enrollment.

U.S. Appl. No. 15/226,375, filed Aug. 2, 2016, Selective Passive Voice Authentication.

U.S. Appl. No. 14/491,740, filed Sep. 19, 2014, Systems and Methods for Authentication Program Enrollment.

* cited by examiner

SELECTIVE PASSIVE VOICE AUTHENTICATION

CROSS-REFERENCE TO RELATED APPLICATIONS

The present application is a continuation of U.S. patent application Ser. No. 15/993,933, entitled "SELECTIVE PASSIVE VOICE AUTHENTICATION,", filed May 31, 2018, now allowed, which is a continuation of U.S. patent application Ser. No. 15/226,375, entitled "SELECTIVE PASSIVE VOICE AUTHENTICATION," filed Aug. 2, 2016, issued as U.S. Pat. No. 10,013,983 on Jul. 3, 2018 which is a continuation-in-part of U.S. patent application Ser. No. 14/491,740 entitled "SYSTEMS AND METHODS FOR AUTHENTICATION PROGRAM ENROLLMENT," filed on Sep. 19, 2014, issued as U.S. Pat. No. 9,548,979 on Jan. 17, 2017 and a non-provisional application of and claims priority to U.S. Provisional Application No. 62/200,416 entitled "SELECTIVE PASSIVE VOICE AUTHENTICATION," filed on Aug. 3, 2015, each of which are hereby expressly incorporated by reference for all purposes in their entireties.

BACKGROUND

User authentication is implemented to ensure that a user is who they purport to be. For example, a user of a computing device can attempt to log into a back-end system. User authentication can be implemented to ensure that the user is authorized to log into the back-end system. In some examples, authentication can be achieved based on user credentials (e.g., username, password).

Biometric authentication enables users to be authenticated based on physical features that are unique to the user (e.g., facial features, voice). Biometric authentication is advantageous in that it is not easily spoofed, and that it does not require the user to remember credentials (e.g., username, password). Biometric authentication, however, requires active input to a workflow (e.g., providing image(s) for facial recognition, recording voice for voice recognition), which can result in delay (e.g., time to provide active input) and can consume resources (e.g., processors and/or memory to process active input).

SUMMARY

Implementations of the present disclosure are generally directed to providing passive voice authentication of users to enable secure login. More particularly, implementations of the present disclosure are directed to passively processing voice commands provided by a user and selecting at least one voice command for voice authentication of the user. In this manner, for example, when the user inputs the voice command, the user is authenticated based on the voice command, and requested functionality is triggered in response to the voice command if the user is authenticated.

In general, innovative aspects of the subject matter described in this specification can be embodied in methods that include actions of receiving first voice data from a user device, the first voice data including audio data of a user speaking a first voice command, and determining that the first voice command includes a voice command for which voice recognition can be performed and, in response, initiating a passive authentication scheme for selectively enabling access to secure data in response to the first voice command, the passive authentication scheme including: providing the first voice data for voice recognition and receiving an indication that the user is authenticated based on the voice recognition and, in response, enabling communication between the user device and a back-end system. Other implementations of this aspect include corresponding systems, apparatus, and computer programs, configured to perform the actions of the methods, encoded on computer storage devices.

These and other implementations can each optionally include one or more of the following features: determining that the first voice command comprises a voice command, for which voice recognition can be performed, includes: determining that the first voice command is included in a set of voice commands for which voice recognition can be performed, and determining that a voice profile that is specific to the first voice command and the user is usable for voice authentication of the user; the set of voice commands includes at least one voice command in a superset of voice commands, the superset of voice commands including voice commands that can be executed; enabling communication between the user device and a back-end system includes providing secure data for display to the user, the secure data being selected for display based on the first voice command; actions further include: receiving second voice data from the user device, the second voice data including audio data of the user speaking a second voice command, and determining that the second voice command comprises a voice command for which voice recognition is not to be performed and, in response, initiating an active authentication scheme for selectively enabling access to secure data in response to authentication data received during the active authentication scheme; the active authentication scheme includes: providing an authentication interface for display on the user device, the authentication interface enabling user input of the authentication data, receiving the authentication data, and selectively enabling communication between the user device and a back-end system based on the authentication data; determining that the second voice command comprises a voice command, for which voice recognition is not to be performed includes: determining that the second voice command is included in a set of voice commands, for which voice recognition can be performed, and determining that a voice profile that is specific to the second voice command and the user is not usable for voice authentication of the user; actions further include displaying a message on the user device indicating that the first voice command can be used for voice authentication of the user; and displaying the message is performed in response to determining that a voice profile that is specific to the first voice command and the user is usable for voice authentication of the user.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are generally directed to providing passive voice authentication of users to enable secure login. More particularly, implementations of the present disclosure are directed to passively processing voice commands provided by a user and selecting at least one voice command for voice authentication of the user. In this manner, for example, when the user inputs the voice command, the user is authenticated based on the voice command, and requested functionality is triggered in response to the voice command if the user is authenticated.

Implementations of the present disclosure will be described in further detail with reference to an example context. The example context includes a user logging into a service through an application executed on a mobile computing device. In some examples, the service enables the user to access secure data (e.g., a banking account, through which the user can access financial information). It is contemplated, however, that implementations of the present disclosure can be used in any appropriate context (e.g., a user remotely logging into an account to access patient data in a healthcare context).

Figure 1:
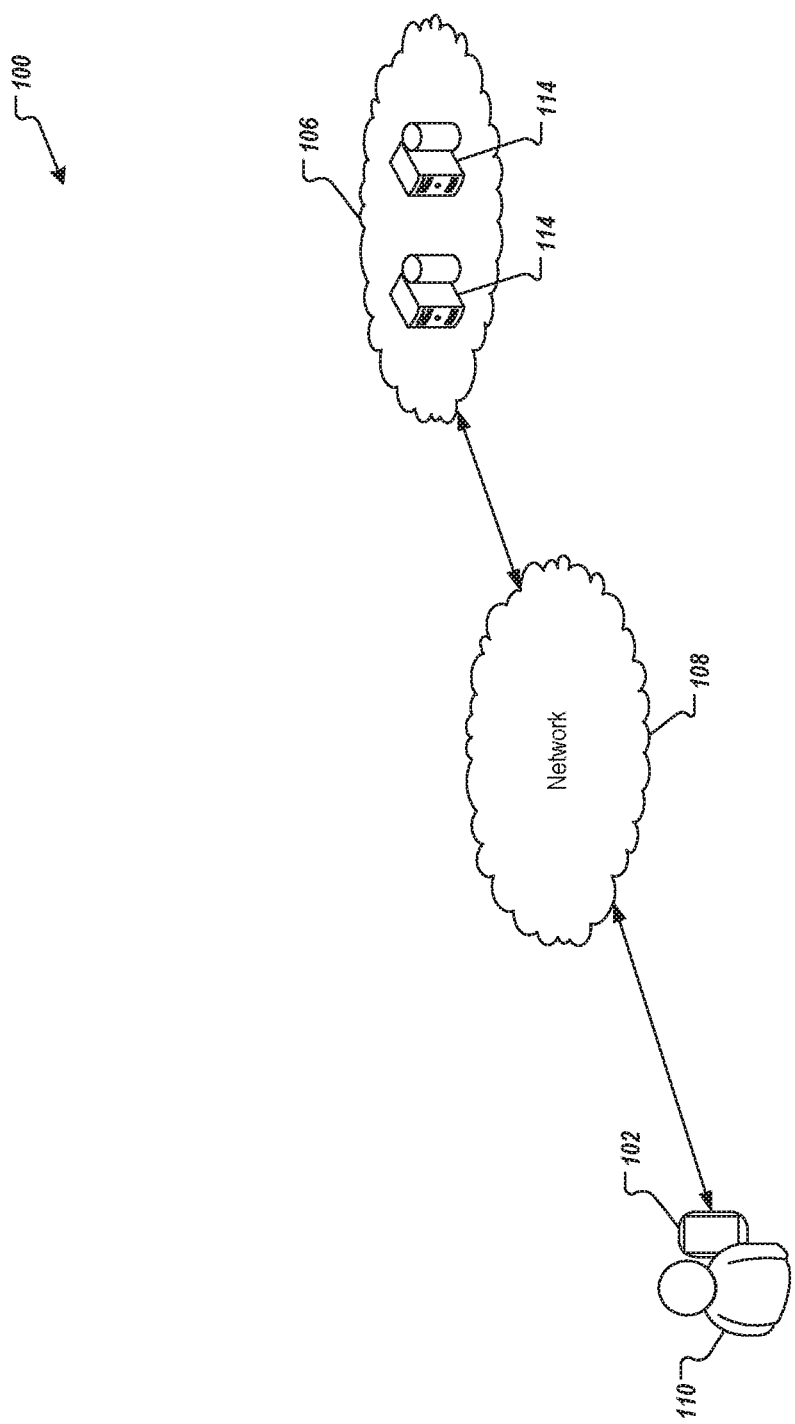
FIG. 1 depicts an example environment in accordance with implementations of the present disclosure.

FIG. 1 depicts an example environment 100, in which implementations of the present disclosure can be provided. In some examples, the example environment 100 enables a user to securely log into an account using a computing device. The example environment 100 includes a computing device 102, a back-end system 106, and a network 108. In some examples, the computing device 102 is used by a user 110 to log into and interact with the back-end system 106 over the network 108.

In the depicted example, the computing device 102 is provided as a smartphone. It is contemplated, however, that implementations of the present disclosure can be realized with any appropriate computing device (e.g., smartphone, tablet, laptop computer, desktop computer). In some examples, the network 108 includes a local area network (LAN), wide area network (WAN), the Internet, or a combination thereof, and connects websites, user devices (e.g., the computing device 102), and the back-end systems (e.g., back-end system 106). In some examples, the network 108 can be accessed over a wired and/or a wireless communications link. For example, mobile computing devices such as smartphones can utilize a cellular network to access the network 108.

In the depicted example, the back-end system 106 includes at least one server system 114. In some examples, the at least one server system 114 hosts one or more computer-implemented services that users can interact with using computing devices. For example, the computing device 102 can be used to communicate with a service hosted by the back-end system 106 over the network 108. In some examples, the computing device 102 includes a computer-executable application executed thereon, which can be used to log into the service and establish a communication session between the computing device 102 and the back-end system 106. For example, the computing device 102 can execute a mobile application (mobile app) to access the back-end system 106. In some examples, the computing device 102 includes a web browser application executed thereon, which can be used to display one or more web pages of the service, the user interacting with the service through the web page(s).

Implementations of the present disclosure are generally directed to passively authenticating users based on voice commands. More particularly, implementations of the present disclosure are directed to sampling voice commands repeatedly submitted by a user, and selectively enabling at least one voice command for voice authentication. In some implementations, the at least one voice command is included in a set of voice commands that are able to trigger functionality provided by an application. In some implementations, the at least one voice command is included in a sub-set of voice commands of the set of voice commands. In some examples, the sub-set of voice commands includes voice commands that are of sufficient length and/or lexicographical variety to be usable for voice authentication. In some examples, and as described in further detail herein, the user can transition from using an active authentication scheme to a passive authentication scheme based on the at least one voice command.

In some implementations, the user can establish a user profile to access a service hosted by a back-end system. In some examples, the user profile includes user-specific information. Example user-specific information includes, without limitation, first name, last name, mailing address, email address and telephone number. In some examples, the user profile includes device-specific information that is unique to one or more computing devices that the user uses to access the service. For example, the device-specific information can include one or more unique identifiers (e.g., Internet Protocol (IP) addresses) assigned to respective devices that the user uses to access the service (e.g., laptop computer, desktop computer, tablet, smartphone).

In some implementations, the user profile further includes authentication information that can be used to authenticate the user. For example, the user profile can include, without limitation, a username, a password, and a personal identification number (PIN) (e.g., each selected by the user). In some examples, the user profile can include biometric data corresponding to one or more biometric authentication forms. In some examples, the user requests the ability to be authenticated based on one or more authentication forms and, for each biometric authentication form, can provide respective biometric data. Example biometric authentication forms include, without limitation, facial recognition, voice recognition, fingerprint recognition, iris recognition, retina recognition, hand geometry recognition, and vein recognition. For example, the user can request authentication based on facial recognition or voice recognition. Consequently, the user can provide (e.g., during an enrollment session) biometric data to enable facial recognition (e.g., one or more images of the user's face) and voice recognition (e.g., one or more voice samples).

In some implementations, after the user has established a user profile, the user can log into the service that is hosted by the back-end system. For example, the user can use a computing device to provide user credentials (e.g., username, password), which can be used by the back-end service to perform a primary authentication. For example, a request can be sent from the computing device of the user to the back-end system (e.g., over a network), the request including the credentials. If the credentials that the user provides match credentials that the back-end service has stored, the user is determined to be primarily authenticated and is able to access the service. That is, for example, a secure session is established between the computing device of the user and the back-end system (e.g., using secure sockets layer (SSL), transport layer security (TSL)). In this manner, data that is communicated between the computing device and the back-end system is encrypted for transmission.

In some examples, the primary authentication is further based on a unique identifier of and/or a token stored on the computing device that the user is using to access the back-end system. For example, a request can be sent from the computing device of the user to the back-end system (e.g., over a network), the request including the credentials and the unique identifier of and/or the token stored on the computing device. If the credentials match credentials that the back-end service has stored, and the unique identifier matches a unique identifier associated with the user profile stored at the back-end system, and/or the token is determined to be authentic, the user is determined to be primarily authenticated and is able to access the service.

In some implementations, although the user has been primarily authenticated, a secondary authentication can be performed. For example, after the user has logged into the service, the user requests access to secure data (e.g., financial data, patient data) through the service. In some examples, the secondary authentication is performed to again authenticate the user before enabling access to the secure data. In some examples, the secondary authentication can be referred to as a quick login that requires relatively less effort on the part of the user. For example, the secondary authentication includes authentication that is not based on credentials. In this manner, the user is not required to again input credentials (e.g., username, password).

In some implementations, and in accordance with implementations of the present disclosure, secondary authentication can be conducted based on an active authentication scheme or a passive authentication scheme. In some examples, an active authentication scheme requires the user to actively input authentication data that is specific to an authentication form. As described in further detail herein, the active authentication scheme can be implemented until a sufficient number of voice samples based on voice commands are submitted by the user during use of the system, and the passive authentication scheme can be enabled based on the voice commands. In some examples, the passive authentication scheme does not require the user to actively input authentication data that is specific to an authentication form. Instead, voice data already provided by the user is used as authentication data for authenticating the user. Accordingly, the passive authentication scheme can be provided as an alternative to the active authentication scheme.

In some implementations, the active authentication scheme includes providing an authentication interface for display on the computing device, and the user using the authentication interface to provide authentication data (e.g., PIN, voice input, image (facial) input). In some examples, the user is authenticated based on the authentication data and is allowed access to the secure data. Accordingly, the active authentication scheme includes the use of an authentication interface in response to a user request for access to secure data through which the user provides authentication data. In some implementations, secondary authentication in the active authentication scheme is performed based on one of a plurality of authentication forms. In some examples, the plurality of authentication forms includes a plurality of biometric authentication forms (e.g., facial recognition, voice recognition). In some examples, the plurality of authentication forms includes a PIN.

For example, for facial recognition, the user can use the authentication interface to enable one or more images of the user's face to be captured (e.g., using a camera of the computing device). In some examples, each of the one or more images is encrypted for transmission over a network. In some examples, the image quality is compressed for efficient data transfer (e.g., compressed up to 80% at 640× 480 resolution). In some examples, a camera of the computing device is automatically activated to capture images in response to user selection of facial recognition. In some examples, the camera is automatically activated to again capture images in response to a facial recognition authentication failure. In some examples, facial recognition can also include authenticating based on features seen in a background. In some examples, the one or more images can include a person's face, as well as background features. For example, the computing device can include an automated teller machine (ATM), with which the user is attempting facial recognition authentication using a camera of the ATM. Because the ATM camera and background features may be static, authentication can be further based on confirming that the background features are also present in the one or more images.

As another example, for voice recognition, the user can use the authentication interface to capture an audio recording of the user's voice (e.g., using a microphone of the computing device). In some examples, voice recognition is based on a voice sample of limited duration (e.g., 15 seconds). In this manner, authentication data can be efficiently transferred.

As another example, for PIN authentication, the user can use the authentication interface to input a PIN. In some examples, authentication data provided through the authentication interface is processed to authenticate the user.

In some implementations, the passive authentication scheme includes authenticating the user based on a voice command input by the user and allowing user access to the secure data if the user is authenticated. In some implementations, the passive authentication scheme is provided if it is determined that the voice command is usable for voice authentication. Accordingly, secondary authentication in the passive authentication scheme is performed based on voice recognition. In some examples, and as described herein, the passive authentication scheme does not implement an authentication interface. That is, besides providing the voice command, the user is not required to provide additional authentication data because the voice command itself is the authentication data. In this manner, the authentication process (e.g., secondary authentication) is simplified, and there is reduced resource consumption (e.g., communication bandwidth, processors, memory), as compared to active authentication.

In some implementations, whether in the active authentication scheme or the passive authentication scheme, once the authentication data has been transmitted, the authentication data is deleted from the computer-readable memory of the computing device. In some implementations, if the user is authenticated, user access to the secure data is enabled. For example, functionality (e.g., displaying secure data) can be automatically performed in response to a voice command.

In some implementations, if the user is not authenticated, authentication can again be attempted. For example, a predetermined number of authentication attempts (X) can be provided. In some examples, if the predetermined number of authentication attempts (X) is achieved, the user is denied access to the secure data. In some examples, if a predetermined number of authentication attempts (Y) is achieved, the user is able to select another authentication form. For example, if the user is not authenticated in the passive authentication scheme, the active authentication scheme can be implemented. In some implementations, if the user is not authenticated using passive authentication, the user is able to select another authentication form regardless of whether a predetermined number of authentication attempts has been achieved. In some examples, an indication can be provided to indicate to the user why the authentication attempt failed.

In some implementations, the passive authentication scheme is available after a sufficient number of samples of a voice command are provided to reliably authenticate the user based on the voice command. In some examples, a set of voice commands is provided, the set of voice commands including voice commands that are supported by an application through which the user requests access to secure data. By way of example, the application can include a banking application through which the user can access bank account information, investment account information, and/or insurance information, as well as transfer funds and/or pay bills. In this example, the set of voice commands can include, without limitation, "show me my account balances," "account balances," "show me my checking account balance," "checking account balance," "checking balance," "show me my savings account balance," "savings account balance," "savings balance," "pay bills," "transfer funds," "transfer funds from savings to checking," "transfer funds from checking to savings," "show me my insurance account," and "insurance account." For example, the voice command "show me my account balances" is a user request to access bank account information (e.g., secure data).

In some implementations, each voice command maps to a particular function that is to be executed in response to the voice command. In some examples, the mapping can be one to many. Continuing with the example commands above, the voice commands "show me my account balances" and "account balances" can map to functionality that is executed to cause balances of all accounts of the user to be displayed. As another example, the voice commands "show me my checking account balance," "checking account balance," and "checking balance" can each map to functionality that is executed to cause a balance of only a checking account of the user to be displayed. As another example, the voice commands "show me my savings account balance," "savings account balance," and "savings balance" can each map to functionality that is executed to cause a balance of only a savings account of the user to be displayed.

In some implementations, when a voice command is received, that voice data underlying the voice command is processed to determine the functionality to which the voice command is mapped. For example, the voice data can be provided as a computer-readable audio file. In some examples, the voice data is processed for speech recognition, which includes providing textual data from audio data. In some examples, the textual data is processed to map the voice command to the functionality. For example, and continuing with the example voice commands provided above, the audio data can include the user speaking "show me my savings account balance," which can be processed for speech recognition to provide the text "show me my savings account balance," which can be processed to map the voice command to functionality that is executed to cause a balance of a savings account of the user to be displayed. As another example, the audio data can include the user speaking "savings account balance," which can be processed for speech recognition to provide the text "savings account balance," which can be processed to map the voice command to the functionality that is executed to cause a balance of a savings account of the user to be displayed.

In some examples, a fuzzy-matching algorithm can be used to map the received voice command to a voice command that can be used to trigger functionality. For example, the received voice command can include "I would like to see my savings account balance," and can be processed using a fuzzy-matching algorithm to map to the voice command "savings account balance," which triggers functionality that is executed to cause a balance of a savings account of the user to be displayed.

In accordance with implementations of the present disclosure, voice data of voice commands can be processed for voice recognition, which can be a type of user authentication. In some examples, a sub-set of voice commands is provided, the sub-set of voice commands including voice commands that are of sufficient length and/or lexicographical diversity to be used for voice authentication. That is, for example, voice commands in the sub-set of voice commands include voice commands that, when spoken, provide a voice profile for the user that can be used to authenticate the user with at least a threshold degree of confidence.

It can be noted that speech recognition is distinct from voice recognition. In some examples, speech recognition is performed to provide textual data from audio data, regardless of the speaker whose voice is captured in the audio data. In some examples, voice recognition is performed to identify the speaker whose voice is captured in the audio data.

In some examples, the sub-set of voice commands includes all of the voice commands in the set of voice commands (e.g., all voice commands in the set of voice commands are of sufficient length and/or lexicographical diversity to be used for voice authentication). In some examples, the sub-set of voice commands includes less than all of the voice commands in the set of voice commands (e.g., only some of the voice commands in the set of voice commands are of sufficient length and/or lexicographical diversity to be used for voice authentication). Continuing with the example above, it can be determined that the sub-set of voice commands includes "show me my account balances," "show me my checking account balance," "checking account balance," "show me my savings account balance," "savings account balance," "transfer funds from savings to checking," "transfer funds from checking to savings," and "show me my insurance account" are included in the sub-set of voice commands. That is, for example, "account balances," "checking balance," "savings balance," "pay bills," "transfer funds," and "insurance account" are not of sufficient length and/or lexicographical diversity to be used for voice authentication.

In accordance with implementations of the present disclosure, a set of voice authentication commands is provided. In some examples, each voice authentication command in the set of voice authentication commands is a voice command for which sufficient samples have been provided from a particular user to reliably authenticate the particular user based on the voice command. In some examples, the set of voice authentication commands is initially empty for the user (e.g., when the user initially downloads/installs the application, the set of voice authentication commands is empty). Consequently, the active authentication scheme is used until sufficient samples of voice commands are provided to include one or more voice authentication commands in the set of voice authentication commands. That is, and as described in further detail herein, in response to the user speaking a voice command, an authentication interface is displayed through which the user provides authentication data, and if the user is authenticated, the functionality requested using the voice command is performed (e.g., secure data is displayed to the user).

In some implementations, and as described in further detail herein, after a voice authentication command is added to the set of voice authentication commands, the passive authentication scheme can be performed based on the voice command. That is, and as described in further detail herein, in response to the user speaking a voice command that is included in the set of voice authentication commands, the voice command itself is used to authenticate the user (e.g., voice recognition), and if the user is authenticated, the functionality requested using the voice command is performed (e.g., secure data is displayed to the user). In this manner, an authentication interface need not be displayed to the user and no additional authentication data need be provided by the user other than the voice command the user had already spoken. In some implementations, when a voice authentication command is added to the set of voice authentication commands, a message is provided to the user indicating that the voice authentication command can be used for passive authentication.

Figure 2:
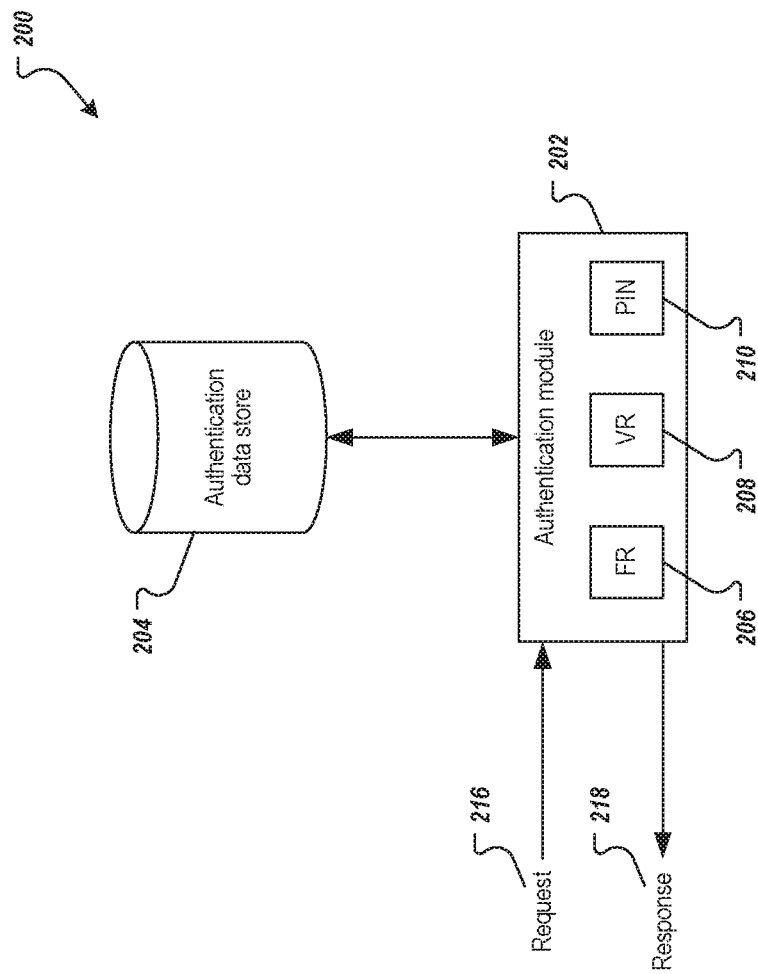
FIG. 2 depicts an example portion of a system that can be used to realize implementations of the present disclosure.

FIG. 2 depicts an example portion of a system 200 that can be used to realize implementations of the present disclosure. In some examples, the system 200 is provided as a portion of the service that is hosted by the back-end system (e.g., the back-end system 106 of FIG. 1). In some examples, the system 200 is independent of the service that is hosted by the back-end system but receives requests from and provides responses to the service. In some examples, the system 200 is provided as a portion of an application that is executed by the computing device (e.g., the computing device 102 of FIG. 1). In some examples, the system 200 is independent of the application that is executed by the computing device but receives requests from and provides responses to the application.

The example system 200 includes an authentication module 202 and an authentication data store 204. In the depicted example, the authentication module 202 includes a facial recognition sub-module 206, a voice recognition sub-module 208 and a PIN sub-module 210. It is contemplated that the authentication module 202 can include any appropriate sub-modules (e.g., fingerprint recognition, iris recognition, retina recognition, hand geometry recognition, vein recognition). In some examples, the authentication module 202 and each of the sub-modules 206, 208, 210 are provided as one or more computer-executable programs that can be executed by one or more computing devices (e.g., computing device 102, server system 114).

In some implementations, the authentication module 202 authenticates a user based on authentication data stored in the authentication data store 204. For example, the authentication module 202 can receive a request 216 for authentication of a user. In some examples, the request includes a data set that can include, without limitation, a user identifier and authentication data. In some examples, the authentication module 202 determines a form of authentication to be used based on the authentication data and provides the request to an appropriate sub-module. For example, if the authentication data includes image data, the request can be provided to the facial recognition sub-module 206. As another example, if the authentication data includes audio data, the request can be provided to the voice recognition sub-module 208.

In some implementations, authentication data associated with the user is provided from the authentication data store 204. In some examples, the authentication data store 204 stores ground-truth authentication data provided by the user (e.g., during an enrollment process) and is indexed by the user identifier, which is unique to the user.

In some examples, the authentication data store 204 stores ground-truth authentication data passively provided by the user during use of the application based on voice commands and is indexed by the user identifier, which is unique to the user. That is, as the user issues voice commands to the application, a voice profile that is specific to the user and to a particular voice command can be provided. Over time, the voice profile can be determined to be of sufficient accuracy such that the voice profile can be used for passive authentication of the user based on the respective voice command.

For example, if the user issues the voice command "show me my account balance" to the application, the voice command is sufficient for use in voice authentication (e.g., is included in the sub-set of voice commands determined to be of sufficient accuracy). In some examples, in response to the first instance of the user speaking "show me my account balance," a voice profile of the user for that particular voice command can be provided. Over time, the user can continue to issue the voice command "show me my account balance," each instance being a sample that can be added to the voice profile of the user for that particular voice command. As more samples are available, the voice profile can become ground-truth authentication data for authenticating the user based on the voice command. When it is determined that the voice profile is sufficient ground-truth authentication data for authenticating the user based on the voice command, the voice command can be added to the set of voice authentication commands, and passive authentication of the user can be enabled based on the voice command. That is, the next time the user speaks the voice command "show me my account balance," voice authentication can be automatically performed based on the voice command in the passive authentication scheme.

During authentication, whether active or passive, authentication data is retrieved from the authentication data store 204 based on the user identifier and authentication data provided in the request. For example, if the authentication data includes image data, the facial recognition sub-module 206 can retrieve ground-truth image data from the authentication data store 204 based on the user identifier. As another example, if the authentication data includes audio data, the voice recognition sub-module 208 can retrieve ground-truth audio data from the authentication data store 204 based on the user identifier.

In some implementations, the user is authenticated based on a comparison between the ground-truth authentication data and the authentication data received with the request. In some examples, if the authentication data received with the request is sufficiently similar to the ground-truth authentication data, the user is determined to be authentic. Consequently, a response 218 can be provided, which includes data indicating that the user has been authenticated. In some examples, if the authentication data received with the request is not sufficiently similar to the ground-truth authentication data, the user is determined to be inauthentic. Consequently, a response 218 can be provided that includes data indicating that the user is not authenticated.

In some implementations, an authentication score can be provided based on the comparison between the ground-truth authentication data and the authentication data received with the request. In some examples, the authentication score indicates a degree to which the authentication data matches the ground-truth authentication data. In some examples, the authentication score can be compared to a threshold authentication score. If the authentication score exceeds the threshold authentication score, the user is determined to be authentic. If the authentication score does not exceed the threshold authentication score, the user is determined not to be authentic.

In some implementations, authentication scores can be compounded to enhance the authentication determination. For example, a first authentication score can be provided at a first time when the user is attempting to access first functionality and/or data, and the user can be authenticated based on the first authentication score (e.g., the first authentication score is compared to the threshold authentication score). A second authentication score can be provided at a second time (e.g., shortly after the first time) when the user is attempting to access second functionality and/or data, and the user can be authenticated based on the first authentication score and the second authentication score. For example, the first authentication score and the second authentication score can be combined to provide a compound authentication score. In some examples, the compound authentication score is an average of the first authentication score and the second authentication score. In some examples, the compound authentication score is a weighted average of the first authentication score and the second authentication score (e.g., respective weights are applied to the first and second authentication scores). In this manner, the respective authentication scores influence the compound authentication score differently. The compound authentication score can be compared to the threshold authentication score to authenticate the user.

In some examples, it can be determined that the authentication data received with the request is insufficient to conduct user authentication. For example, the image data can be insufficient, such that a sufficiently clear image of the user's face is not determinable. Consequently, a response 218 can be provided that includes data indicating that facial recognition cannot be performed. In some examples, the response 218 further includes data indicating why facial recognition cannot be performed (e.g., too dark, too blurry). As another example, the audio data can be insufficient, such that a sufficiently clear audio of the user's voice is not determinable. Consequently, a response 218 can be provided that includes data indicating that voice recognition cannot be performed. In some examples, the response 218 further includes data indicating why voice recognition cannot be performed (e.g., too noisy).

In some implementations, user access to secure data is allowed or denied based on the response 218 received from the authentication module 202.

FIGS. 3A-3F depict screenshots that can be provided in implementations of the present disclosure. The example screenshots correspond to the example context, which includes the user logging into a financial service through which the user is able to access financial data (e.g., bank accounts, investments), transfer or deposit assets, and pay bills.

Figure 3B:
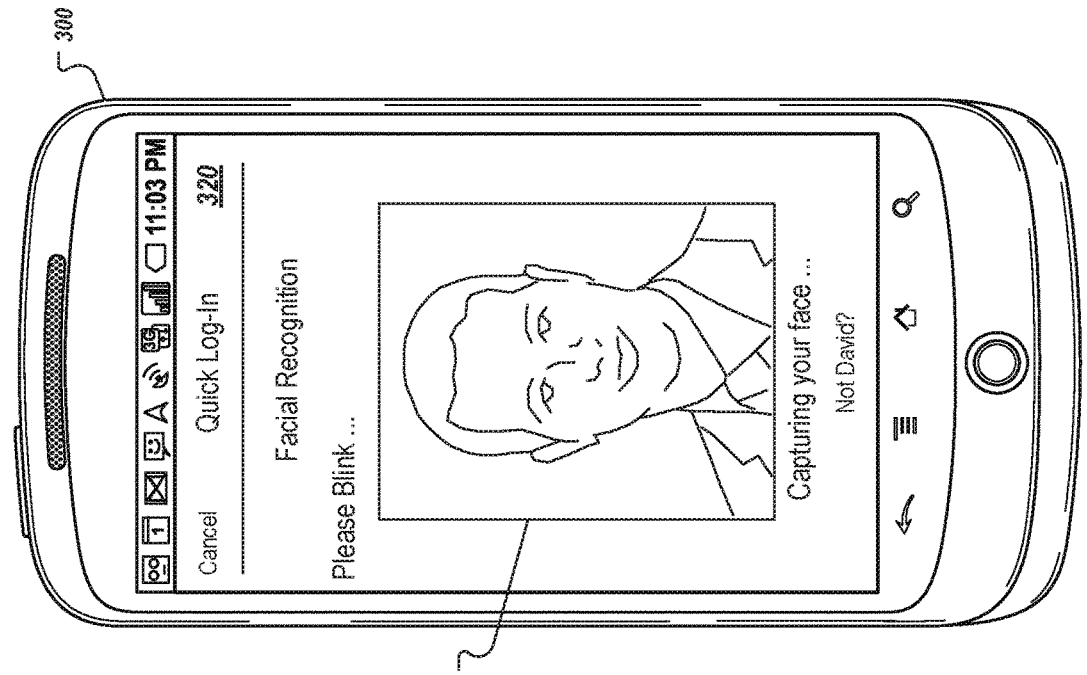
FIGS. 3A-3F depict screenshots that can be provided in implementations of the present disclosure.
Figure 3A:
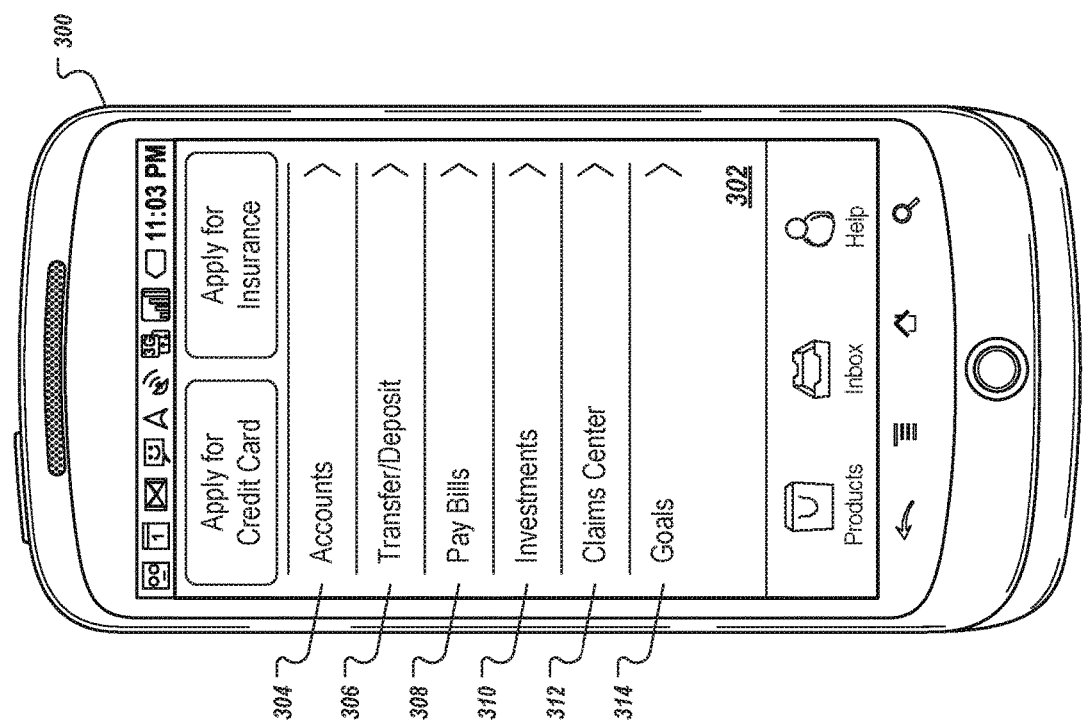

FIG. 3A depicts an example computing device 300 (e.g., a smartphone) displaying a selection screen 302. In some examples, the user can use the computing device 300 to log into a service provided by a back-end system. For example, a login screen (not depicted) can be provided through which the user can provide credentials (e.g., username, password). The user can be primarily authenticated based on the credentials and, in response, the selection screen 302 can be displayed.

In the depicted example, the selection screen 302 includes an accounts selection 304, a transfer/deposit selection 306, a pay bills selection 308, an investments selection 310, a claims center selection 312, and a goals selection 314. In some examples, the user can select the accounts selection 304 to initiate access to one or more accounts (e.g., checking account, saving account), the transfer/deposit selection 306 to initiate access to an asset transfer and/or asset deposit service, the pay bills selection 308 to enable access to a bill pay service, the investments selection 310 to initiate access to one or more investment accounts, the claims center selection 312 to initiate access to an insurance claims service, or the goals selection 314 to initiate access to a goals service (e.g., through which the user establishes and tracks one or more financial goals). In some examples, at least one of the selections is associated with secure data. Consequently, a secondary authentication is initiated in response to user selection. For example, in response to selection of the accounts selection 304 from the selection screen 302, the secondary authentication is initiated.

In accordance with implementations of the present disclosure, the user can issue voice commands from a set of voice commands to automatically trigger functionality of the application. In some implementations, the secondary authentication is initiated in response to the user issuing a voice command. For example, in response to the user speaking "show me my account balances," the secondary authentication is initiated.

FIG. 3B illustrates and example computing device 300 (e.g., a smartphone) displaying an authentication screen 320. In some examples, the authentication screen 320 is displayed in the active authentication scheme. For example, the authentication screen 320 can be displayed in response to user selection of the accounts selection 304 from the selection screen 302. As another example, the authentication screen 320 can be displayed in response to the user issuing a voice command that is not in the set of voice authentication commands, hence the passive authentication scheme cannot be used. In the example of FIG. 3B, the secondary authentication is based on facial recognition using the active authentication scheme. In some examples, it can be determined that a default authentication form is facial recognition (e.g., the user has selected facial recognition as the default in the user profile). In the example of FIG. 3B, the authentication screen 320 includes an image 330 that can be processed for authenticating the user based on facial recognition. In some examples, image data is captured using a camera of the computing device, which image data is used to display the image 330. In some examples, the image 330 is a static image. In some examples, the image 330 is a dynamic image (e.g., a live video image).

Figure 3D:
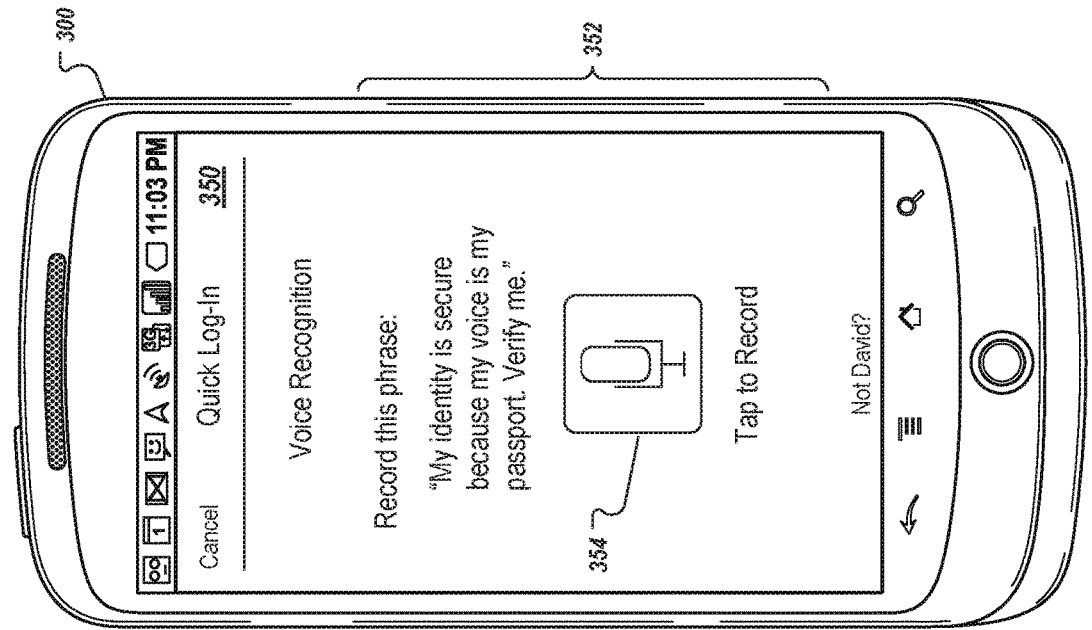
Figure 3C:
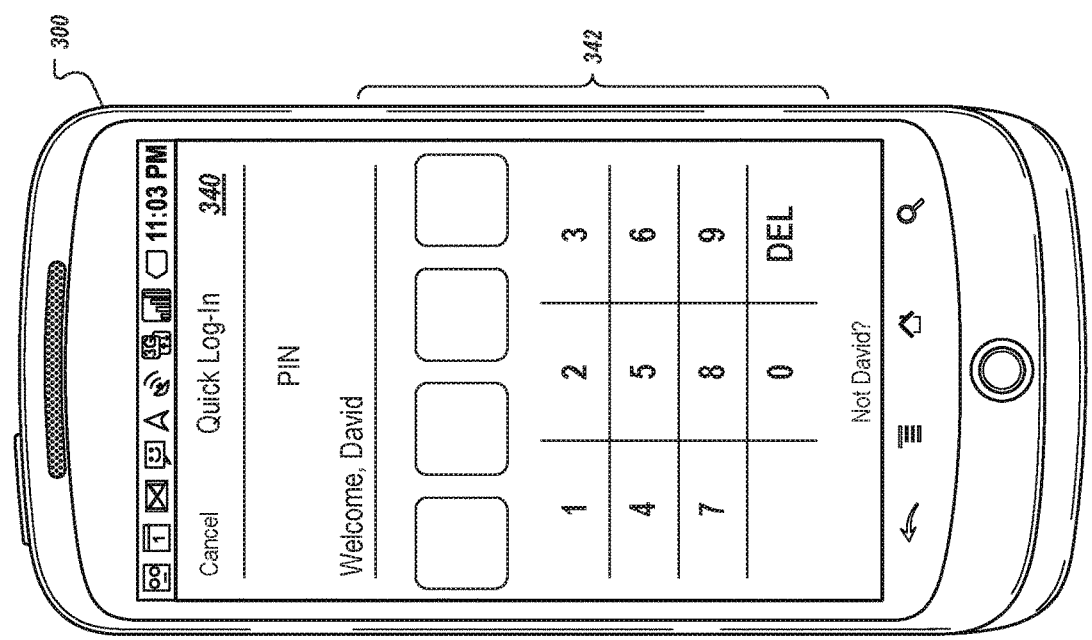

FIG. 3C depicts an authentication screen 340. In some examples, the authentication screen 340 is displayed in the active authentication scheme. For example, the authentication screen 340 can be displayed in response to user selection of the accounts selection 304 from the selection screen 302. As another example, the authentication screen 340 can be displayed in response to the user issuing a voice command that is not in the set of voice authentication commands, hence the passive authentication scheme cannot be used. In the depicted example, the authentication screen 340 includes an input interface 342 that enables the user to input a PIN (e.g., 4-digit PIN).

FIG. 3D depicts an authentication screen 350. In some examples, the authentication screen 350 is displayed in the active authentication scheme. For example, the authentication screen 350 can be displayed in response to user selection of the accounts selection 304 from the selection screen 302. As another example, the authentication screen 350 can be displayed in response to the user issuing a voice command that is not in the set of voice authentication commands, hence the passive authentication scheme cannot be used. In the depicted example, the authentication screen 350 includes an input interface 352 that enables the user to input recorded audio. For example, the user can select an icon 354, and in response, a microphone of the computing device 300 can be activated to capture audio data.

Figure 3F:
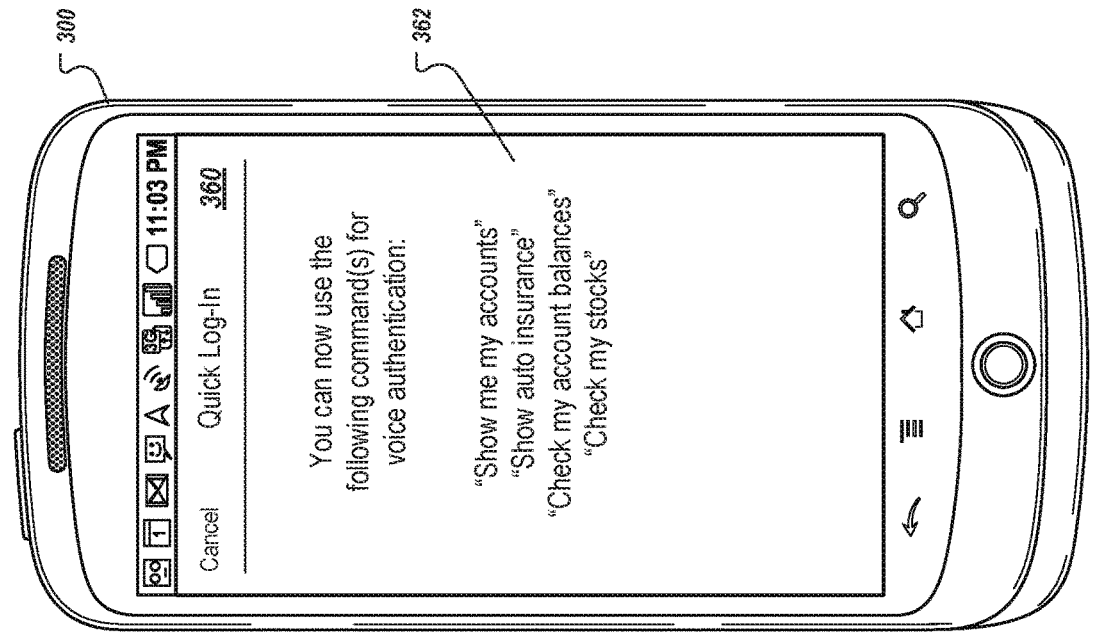
Figure 3E:
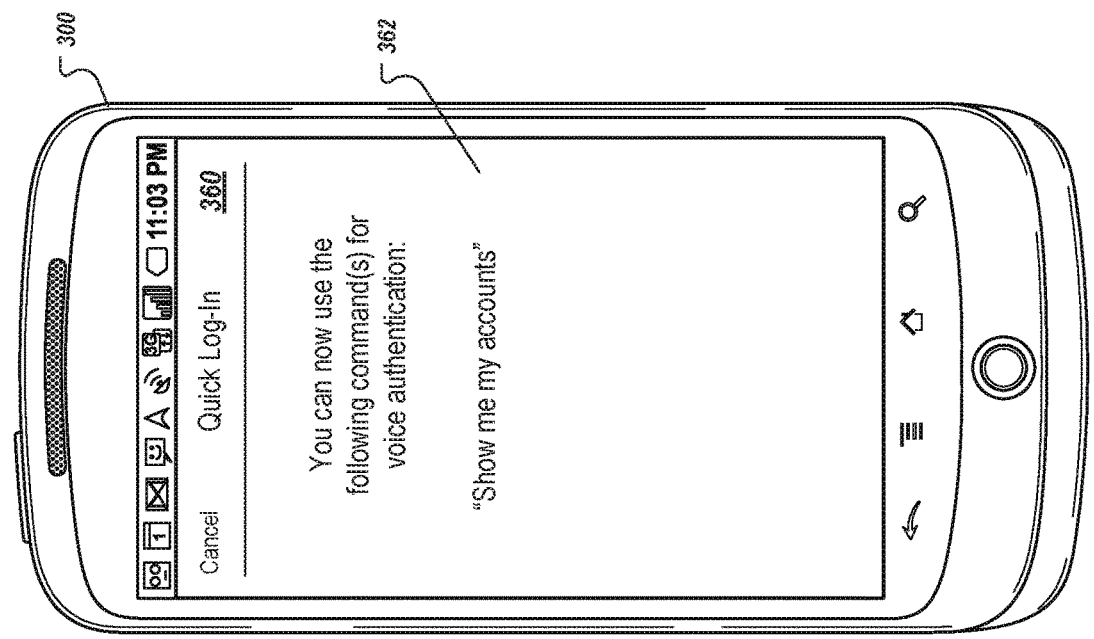

FIGS. 3E and 3F depict a message interface 360. In some implementations, the message interface 360 selectively displays a message 362 indicating one or more voice commands that can be used for passive voice authentication. In some examples, the message 362 is displayed in response to sufficient samples of a voice command being provided, such that the voice command can now be used for passive voice authentication. In the example of FIG. 3E, the message 362 indicates to the user that the voice command "show me my accounts" can be used for passive voice authentication. In the example of FIG. 3F, the message 362 indicates to the user that the voice commands "show me my accounts," "show auto insurance," "check my account balances," and "check my stocks" can each be used for passive voice authentication. Consequently, if, for example, the user is viewing the selection screen 302 of FIG. 3A and issues the voice command "show me my accounts," secondary authentication of the user can automatically be performed based on voice data, and if the user is authenticated, account information can be automatically displayed to the user.

Figure 4:
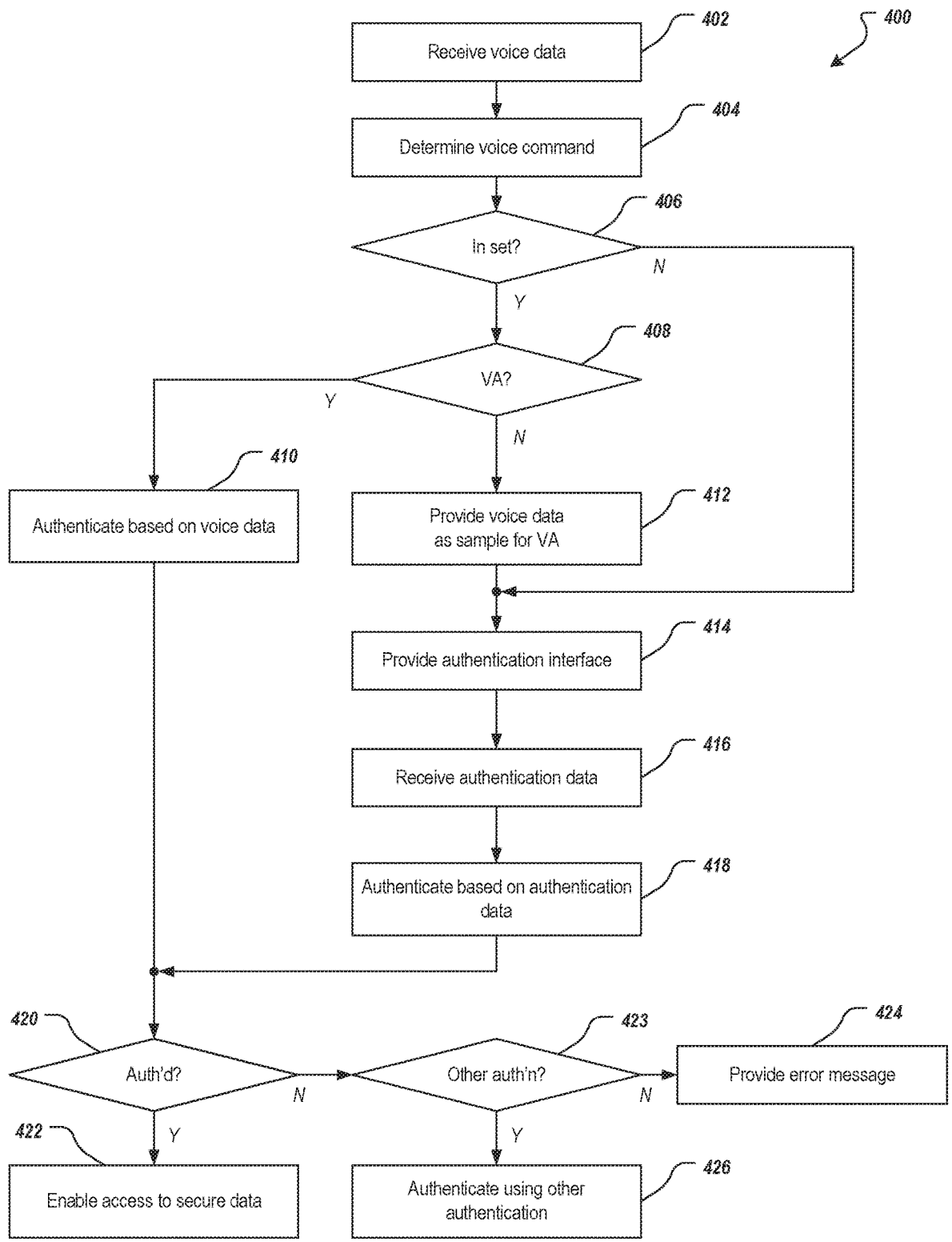
FIG. 4 depicts an example process that can be executed in accordance with implementations of the present disclosure.

FIG. 4 depicts an example process 400 that can be executed in accordance with implementations of the present disclosure. The example process 400 can be implemented, for example, by the example environment 100 of FIG. 1. In some examples, the example process 400 can be provided by one or more computer-executable programs executed using one or more computing devices. For example, the example process 400, or portions thereof, can be provided by one or more programs executed on a computing device 102 and/or a server system 114 of FIG. 1.

Voice data is received (402). For example, a user of a device speaks into a microphone of the device to provide the voice data, and the voice data is received by a back-end system. A voice command is determined from the voice data (404). For example, the voice data is processed by a speech recognition engine (e.g., a voice recognition engine of the authentication module 202 of FIG. 2), which provides the voice command as text based on the speech data.

It is determined whether the voice command is in a set of available voice commands (406). For example, the voice command is compared to available voice commands in the set of available voice commands to determine degrees of similarity between the voice command and respective available voice commands in the set of available voice commands. In some examples, the set of available voice commands is a sub-set of voice commands that can be issued to an application. In some examples, if the voice command is sufficiently similar to an available voice command in the set of available voice commands, it is determined that the voice command is in the set of available voice commands. In some examples, when the voice command is not sufficiently similar to an available voice command in the set of available voice commands, it is determined that the voice command is not in the set of available voice commands. When the voice command is not in the set of available voice commands, an error message is provided (424). For example, the error message can be displayed on the device and can indicate that the voice command spoken by the user is not an available voice command.

When the voice command is in the set of available voice commands, it is determined whether the voice command is usable for voice authentication of the user (408). For example, it can be determined whether the voice command is in a set of voice authentication commands that are available for the particular user. In some examples, when the voice command is in the set of voice authentication commands, it is determined that the voice command is usable for voice authentication of the user. In some examples, when the voice command is not in the set of voice authentication commands, it is determined that the voice command is not usable for voice authentication of the user. When the voice command is usable for voice authentication of the user, authentication is performed based on the voice data (410). That is, passive authentication is performed based on the voice data of the voice command without displaying an authentication interface to the user or receiving additional authentication data. It is determined whether the user is authenticated (420). For example, the authentication module 202 of FIG. 2 can provide a response 218 indicating whether the user has been authenticated. When the user is authenticated, access to secure data is provided (422). For example, account data is displayed to the user in response to the voice command. When the user is not authenticated, it is determined whether other authentication methods can be used (423). When no other authentication methods can be used, an error message is provided (424). For example, an error message indicating that the user cannot be authenticated can be displayed to the user. When other authentication methods can be used, the user is authenticated using other authentication methods (426).

When the voice command is not usable for voice authentication of the user (408), the voice data is provided as a sample for voice authentication (412). For example, the voice data can be used to start (if this instance is the first time that the user used the voice command with the application) or add to (if this instance is another time that the user used the voice command with the application) a voice profile that is specific to the voice command and the user. In this manner, the voice profile can be subsequently used for voice authentication (e.g., after a sufficient number of samples are provided to the voice profile). An authentication interface is provided (414). For example, an authentication interface is displayed to the user. In some examples, the authentication interface can be provided for the user to input authentication data (e.g., facial image, voice sample, PIN) during the active authentication scheme. Authentication data is received (416). For example, authentication data is transmitted from the device of the user to the authentication module 202 of FIG. 2. Authentication of the user is attempted based on the authentication data (418). For example, the authentication module 202 of FIG. 2 attempts to authenticate the user based on the authentication data and respective ground-truth authentication data. It is determined whether the user is authenticated (420), as described herein.

Figure 5:
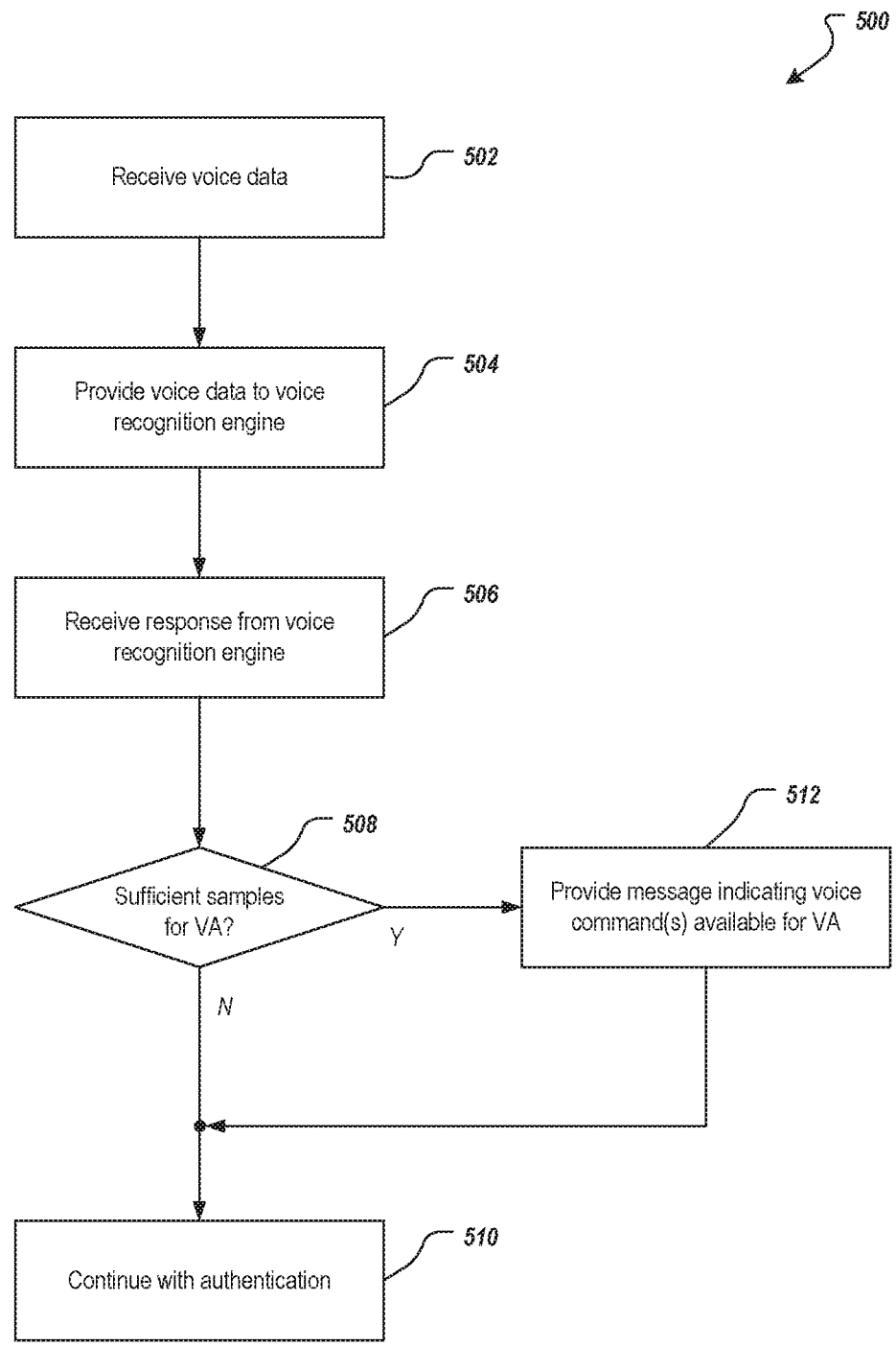
FIG. 5 depicts an example process that can be executed in accordance with implementations of the present disclosure.

FIG. 5 depicts an example process 500 that can be executed in accordance with implementations of the present disclosure. The example process 500 can be implemented, for example, by the example environment 100 of FIG. 1. In some examples, the example process 500 can be provided by one or more computer-executable programs executed using one or more computing devices. For example, the example process 500, or portions thereof, can be provided by one or more programs executed on a computing device 102 and/or a server system 114 of FIG. 1.

Voice data is received (502). For example, and as described above, voice data can be provided in response to the user speaking a voice command. The voice data is provided to a voice recognition engine (504). For example, the voice data can be provided to the voice recognition sub-module 208 of FIG. 2. In some examples, the voice data can be processed to create or add to a voice profile that is specific to the voice command and the user. A response is received from the voice recognition engine (506). For example, the authentication module 202 of FIG. 2 can transmit a response 218 that can be received. It is determined whether there are sufficient samples for subsequent use of the voice command for voice authentication in the passive authentication scheme (508). For example, the response can indicate whether the voice profile based on received voice data samples is now sufficient to be used for voice authentication. When there are sufficient samples for subsequent use of the voice command for voice authentication in the passive authentication scheme, a message is provided indicating that the voice command can be used for voice authentication (e.g., the example messages 362 of FIGS. 3E and 3F) (512), and authentication of the user continues (510) (e.g., based on the active authentication scheme). If there are not sufficient samples for subsequent use of the voice command for voice authentication in the passive authentication scheme, authentication of the user continues (510) (e.g., based on the active authentication scheme).

Implementations of the subject matter and the operations described in this specification can be realized in digital electronic circuitry or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, a data processing apparatus. Alternatively or in addition, the program instructions can be encoded on an artificially generated propagated signal (e.g., a machine-generated electrical, optical, or electromagnetic signal) that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example a programmable processor, a computer, a system on a chip, or multiple ones, or combinations of the foregoing. The apparatus can include special purpose logic circuitry (e.g., an FPGA (field programmable gate array) or an ASIC (application-specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document) in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and the apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions, and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), to name just a few). Devices suitable for storing computer program instructions and data include all forms of non-volatile memory, media and memory devices, including, by way of example, semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device (e.g., a CRT (cathode ray tube) or LCD (liquid crystal display) monitor), for displaying information to the user, and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component (e.g., as a data server), or that includes a middleware component (e.g., an application server), or that includes a front-end component (e.g., a client computer) having a graphical user interface or a Web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network ("LAN"), a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship with each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by at least one processor, the method comprising:
    receiving, from a user, one or more spoken words;
    selecting at least one word from the one or more spoken words to enroll the user into a voice authentication program without requiring further interaction from the user, the voice authentication program for selectively enabling access to secure data in response to receiving the at least one word spoken by the user;
    after enrollment of the user into the voice authentication program, receiving, from the user, the at least one word spoken by the user; and
    authenticating the user based on the at least one word spoken by the user.

2. The computer-implemented method of claim 1,
    wherein selecting the at least one word from the one or more spoken words includes determining whether the at least one word is usable for voice authentication by determining that a voice profile of the user that is specific to the at least one word is usable for the voice authentication of the user.

3. The computer-implemented method of claim 1, the method further comprising:
    in response to authenticating the user based on the at least one word spoken by the user, allowing, to the user, the access to the secure data in a back-end system.

4. The computer-implemented method of claim 3, wherein allowing the access to the secure data comprises providing the secure data for display to the user, the secure data being selected for display based on the at least one word.

5. The computer-implemented method of claim 1, the method further comprising:
    adding the at least one word to a set of available words in a superset of words, wherein the superset of words comprises voice commands that can be executed.

6. The computer-implemented method of claim 5, the method further comprising:
    displaying a message on a user device associated with the user indicating that at least one word can be used for authenticating the user, wherein displaying the message is performed in response to the at least one word being in the set of available words and being useable for voice authentication of the user.

7. The computer-implemented method of claim 5, wherein the method further comprises:
    receiving, by the at least one processor, a second set of spoken words; and
    in response to determining that the second set of spoken words comprises a word that is not in the set of available words that the second set of spoken words is not usable for the voice authentication of the user:
        initiating an active authentication scheme for selectively enabling the access to the secure data in response to authentication data received during the active authentication scheme, wherein the active authentication scheme comprises:
providing, by the at least one processor, an authentication interface for display on a user device, the authentication interface enabling user input of the authentication data;
receiving, by the at least one processor, the authentication data; and
selectively enabling the access to the secure data based on the authentication data.

8. A non-transitory computer-readable medium storing instructions that, when executed by at least one processor, cause the at least one processor to perform operations comprising:
receiving, from a user, one or more spoken words;
selecting at least one word from the one or more spoken words to enroll the user into a voice authentication program without requiring further interaction from the user, the voice authentication program for selectively enabling access to secure data in response to receiving the at least one word spoken by the user;
after enrollment of the user into the voice authentication program, receiving, from the user, the at least one word spoken by the user; and
authenticating the user based on the at least one word spoken by the user.

9. The non-transitory computer-readable medium of claim 8, wherein selecting the at least one word from the one or more spoken words includes determining whether the at least one word is usable for voice authentication by determining that a voice profile of the user that is specific to the at least one word is usable for the voice authentication of the user.

10. The non-transitory computer-readable medium of claim 8, wherein the operations further comprise:
in response to authenticating the user based on the at least one word spoken by the user, allowing, to the user, the access to the secure data in a back-end system.

11. The non-transitory computer-readable medium of claim 10, wherein allowing the access to the secure data comprises providing the secure data for display to the user, the secure data being selected for display based on the at least one word.

12. The non-transitory computer-readable medium of claim 8, wherein the operations further comprise:
adding the at least one word to a set of available words in a superset of words, wherein the superset of words comprises voice commands that can be executed.

13. The non-transitory computer-readable medium of claim 12, wherein the operations further comprise:
displaying a message on a user device associated with the user indicating that at least one word can be used for the authenticating the user, wherein displaying the message is performed in response to the at least one word being in the set of available words and being useable for voice authentication of the user.

14. The non-transitory computer-readable medium of claim 12, wherein the operations further comprise:
receiving, by the at least one processor, a second set of spoken words; and
in response to determining that the second set of spoken words comprises a word that is not in the set of available words or that the second set of spoken words is not usable for the voice authentication of the user:
initiating an active authentication scheme for selectively enabling the access to the secure data in response to authentication data received during the active authentication scheme, wherein the active authentication scheme comprises:
providing, by the at least one processor, an authentication interface for display on a user device, the authentication interface enabling user input of the authentication data;
receiving, by the at least one processor, the authentication data; and
selectively enabling the access to the secure data based on the authentication data.

15. A system comprising:
a data store for storing data; and
at least one processor configured to interact with the data store, the at least one processor being further configured to execute computer-readable instructions to perform operations comprising:
receiving, from a user, one or more spoken words,
selecting at least one word from the one or more spoken words to enroll the user into a voice authentication program without requiring further interaction from the user, the voice authentication program for selectively enabling access to secure data in response to receiving the at least one word spoken by the user,
after enrollment of the user into the voice authentication program, receiving, from the user, the at least one word spoken by the user, and
authenticating the user based on the at least one word spoken by the user.

16. The system of claim 15, wherein selecting the at least one word from the one or more spoken words includes determining whether the at least one word is usable for voice authentication by determining that a voice profile of the user that is specific to the at least one word is usable for the voice authentication of the user.

17. The system of claim 15, wherein the operations further comprise:
in response to authenticating the user based on the at least one word spoken by the user, allowing, to the user, the access to the secure data in a back-end system.

18. The system of claim 17, wherein allowing the access to the secure data comprises providing the secure data for display to the user, the secure data being selected for display based on the at least one word.

19. The system of claim 15, wherein the operations further comprise:
adding the at least one word to a set of available words in a superset of words, wherein the superset of words comprises voice commands that can be executed; and
displaying a message on a user device associated with the user indicating that at least one word can be used for authenticating the user, wherein displaying the message is performed in response to the at least one word being in the set of available words and being useable for voice authentication of the user.

20. The system of claim 15, wherein the operations further comprise:
adding the at least one word to a set of available words in a superset of words, wherein the superset of words comprises voice commands that can be executed;
receiving, by the at least one processor, a second set of spoken words; and
in response to determining that the second set of spoken words comprises a word that is not in the set of available words or that the second set of spoken words is not usable for the voice authentication of the user:

initiating an active authentication scheme for selectively enabling the access to the secure data in response to authentication data received during the active authentication scheme, wherein the active authentication scheme comprises:
- providing, by the at least one processor, an authentication interface for display on a user device, the authentication interface enabling user input of the authentication data;
- receiving, by the at least one processor, the authentication data; and
- selectively enabling the access to the secure data based on the authentication data.

\* \* \* \* \*